March 21, 1961 A. F. ECKEL 2,975,668
OPTICAL SCANNING DEVICE
Filed July 1, 1957
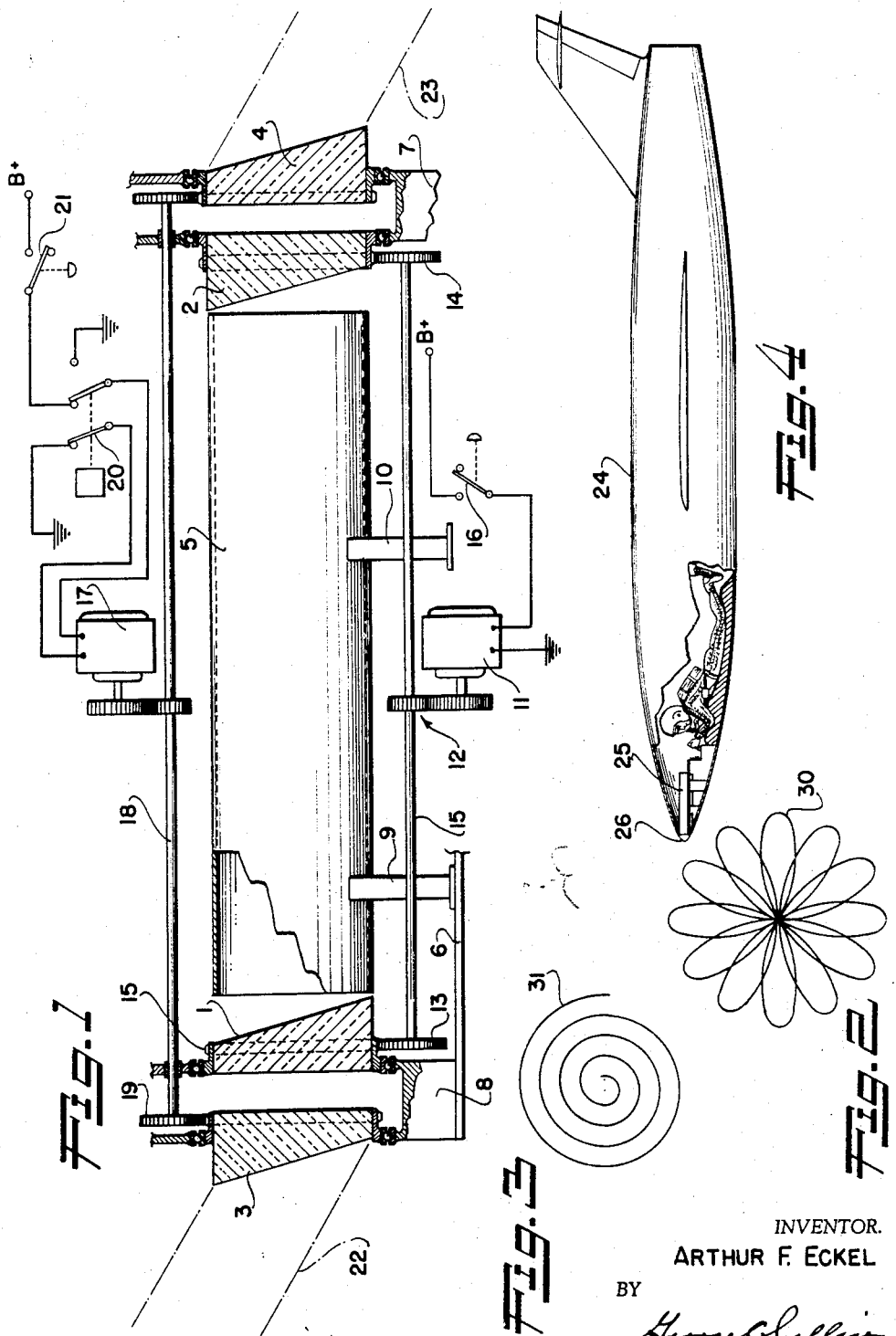
INVENTOR.
ARTHUR F. ECKEL
BY
George C. Sullivan
Agent

United States Patent Office 2,975,668
Patented Mar. 21, 1961

2,975,668

OPTICAL SCANNING DEVICE

Arthur F. Eckel, Burbank, Calif., assignor to Lockheed Aircraft Corporation, Burbank, Calif.

Filed July 1, 1957, Ser. No. 669,095

3 Claims. (Cl. 88—1)

This invention relates to an optical device for expanding the field of view where observation is restricted to a small diameter entrance aperture and the exit aperture is some distance removed therefrom on the optical axis. More particularly the invention maintains parallelism between an entrance and emergent beam where the entrance beam scans the object space at a rate which takes advantage of the persistence of vision and the exit beam forms a replica of the object space in the image space for effectively increasing the field of view.

The environmental effects of temperature on windshields in supersonic aircraft make evident the fact that periscopic type viewers will be a necessity for hypersonic aircraft. With transparent materials now available it is possible to provide windows or ports in the external surface of an aircraft which can withstand the heat and pressures involved so long as they are small, say in the neighborhood of 100 square inches or thereabouts and so long as they are properly faired into the fuselage configuration. An opening of such size in the nose of an aircraft is obviously not adequate to provide the necessary visibility to the pilot and accordingly some wide angle viewing device is needed. The device described herein is particularly suited to such an application; however it should be understood that its utility is broader in scope; the aircraft application being only an illustration of one of the many possible uses for the device.

An object of this invention is to provide an optical scanning device which employs optical wedge pairs angularly disposed relative to one another so that the combined wedge angle of each pair is zero or thereabouts whereby prismatic aberrations causing image distortion is obviated.

Another object of this invention is to provide an optical scanning device which may incorporate a conventional periscopic system and effectively yield a field of view much greater than is possible with periscopic optics alone.

Another object of this invention is to provide an optical scanning device which is dependable in operation and which may be driven by any suitable means such as electrical, hydraulic or mechanical. This design flexibility is a valuable asset in a wide angle viewing device for aircraft where reliability of operation is of substantial importance.

Still another object of this invention is to provide an optical scanning device through which a three dimensional wide angle field may be viewed without glasses or other special equipment by an observer located several feet or more away from the scanning device.

Further and other objects will become apparent from a reading of the following detail description especially when considered in combination with the accompanying drawing wherein like numerals refer to like parts:

In the drawing:

Figure 1 is a fragmentary side view of the optical scanning device;

Figure 2 illustrates rosette scanning;

Figure 3 illustrates spiral scanning; and

Figure 4 shows the optical scanning device in an aircraft.

Referring to Figures 1 and 2 the scanning device includes a pair of inner optical wedges 1 and 2 and a pair of outer optical wedges 3 and 4. Interposed between inner wedges 1 and 2 is a light tube 5 which may if desired include a periscopic lens system (not shown). A suitable frame 6 supports wedges 1, 2, 3 and 4 through brackets 7 and 8 for independent relative rotation on a common axis. Light tube 5 is also supported coaxial of the wedges by brackets 9 and 10 projecting from frame 6.

The pair of inside wedges 1 and 2 are coupled to rotate together at the same velocity by suitable means such as a motor 11 and torque tube gearing 12. At all times, wedges 1 and 2 maintain a zero differential angle; that is, the incident and refracted rays from this combined pair of optical wedges are parallel. Gears 13 and 14 one at either end of torque tube 15 matingly engage the outer periphery 15 of inner wedges 1 and 2. By supplying a source of electrical potential identified in Figure 1 as B+ to drive motor 11 through actuation of switch 16, the inner wedges may be caused to rotate in unison.

A drive system for the outer wedges 3 and 4 similar to that described above in connection with inner wedges 1 and 2 may be employed. For this purpose, a drive motor 17 operating through a torque tube 18 couples outer wedges 3 and 4 together through suitable gearing 19. Outer wedges 3 and 4 like inner wedges 1 and 2 are arranged with a respect to each other to maintain a zero wedge angle. This arrangement of the wedges allows the system to cancel out prismatic aberrations and provide a substantially undistorted image to an observer.

Motor 17 for driving outer wedges 3 and 4 is coupled to a source of electrical potential identified as B+ through a switch 21 and a single pole double throw switch 20 which is wired to reverse polarity to motor 17 and thus rotate wedges 3 and 4 either in the same or opposite directions from the rotation of inner wedges 1 and 2.

If two adjacent wedges as 1 and 3 are rotated relative to one another such that the net wedge angle varies from zero to the sum of the individual wedge angles a beam of light impinging the system is caused to move angularly. By rotating the wedges at the same angular velocity and in opposite directions the light beam is caused to move back and forth parallel to a fixed plane. By rotating the wedges at different velocities in opposite directions the beam of light traces a rosette pattern 30 as illustrated in Figure 2. Also if the two adjacent wedges are rotated in the same direction and at different velocities the beam traces a spiral pattern 31 as indicated in Figure 3. Thus if we combine two such systems into an arrangement as illustrated in Figure 1 wherein the inner wedges 1 and 2 rotate in unison and the outer wedges 3 and 4 likewise rotate in unison though at a different velocity and perhaps also in a different direction from the inner wedges all rays from the entrance light beam 22 into the system continue parallel to a corresponding ray in the emergent beam 23 causing the same pattern to be formed in the image space as was actually scanned. Looking into the scanning device from the emergent beam end an observer with his eyes in the emergent region will be able to see everything encompassed by the entrance scanner (wedges 1 and 3).

Optical wedges 1, 2, 3 and 4 may be of any desired diameter, however for applications in aircraft a diameter in the neighborhood of 3 to 10 inches is considered adequate to permit a complete and sizable picture comparable with that provided by direct viewing through a conventional windshield. In the scanner device, the scanned pattern slightly overlaps throughout the entire field of view and the complete object field is scanned approximately 16 times a second (persistence of vision) or more so that to the observer a completely integrated picture will be presented.

In operation, switches 16 and 21 are closed allowing the electrical potential from B+ to be applied to motors 11 and 17. Through operation of switch 20 the direction of rotation of motor 17 may be reversed for driving outer wedges 3 and 4 either in the same direction or in the opposite direction as inner wedges 1 and 2. With the motors driving the wedges in rotation at the prescribed speed the wedge system scans the object field and presents the image of that field to an observer at the opposite end of the device. The picture image may be viewed at some distance back from the wedges as limited only by the required resolution.

Since the observer need not be close to the wedge system as is required in conventional periscopic sighting systems it is capable of actually simulating a windshield on an aircraft as illustrated in Figure 4. The scanning device 25 is mounted in the aircraft 24 behind a transparent dome 26 of suitable high temperature material such as silica glass. The scanning device being small in diameter will permit the use of the high temperature materials for the dome since airloads on the relatively small area are low as compared with those airloads on a conventional windshield. The scanning device inside aircraft 24 presents the object image to the pilot or observer as indicated in Figure 5. By simply looking into the wedge system, an area comparable in size to that viewable through a conventional windshield may be seen.

Viewing angles in the neighborhood of 60 to 80 degrees are possible with the scanning device described herein and should this be inadequate for any particular application then of course a plurality of the scanning devices could be employed to provide an even larger field of view.

While a specific embodiment of the scanning device has been shown and described it is merely to illustrate the invention. Any suitable type of drive system may be used to rotate the wedges and the device obviously may be used to advantage in any application where a wide field of view is required. Accordingly it should be understood that many alterations, modifications and substitutions may be made to the instant disclosure without departing from the spirit and scope of the invention as defined by the appended claims.

I claim:

1. An optical scanning device comprising, a frame, a pair of spaced inner optical wedges and a pair of spaced outer optical wedges arranged one on either side of said pair of inner optical wedges and all rotatably carried by said frame in generally coaxial alignment, the optical wedges in each pair having at one relative rotational position thereof a zero wedge angle maintaining the refracted light rays parallel to the incident light rays, means locking the pair of inner optical wedges together at said zero wedge angle, means locking the pair of outer optical wedges together at said zero wedge angle, and drive means rotating one pair of optical wedges relative to the other pair of optical wedges to provide a wide angle field of view.

2. An optical scanning device for increasing the field of view comprising, a frame, a pair of inner optical wedges and a pair of outer optical wedges arranged one on either side of said pair of inner optical wedges and coaxially aligned and supported by said frame, a light tube interposed between the pair of inner optical wedges and directing light rays therebetween, the optical wedges in each pair having at one relative rotational postiion thereof a zero wedge angle maintaining the refracted light rays parallel to the incident light rays, drive means locking one of the pair of optical wedges together at said zero wedge angle and effecting rotation thereof in either direction, and drive means locking the other pair of optical wedges together at said zero wedge angle and effecting rotation thereof in only one direction.

3. A wide angle optical scanning device comprising, a frame, a pair of coaxially aligned inner optical wedges spaced apart and rotatably carried by said frame, a pair of outer optical wedges rotatably carried by said frame and spaced one on either side of said pair of inner optical wedges and coaxially aligned therewith, the optical wedges in each pair having at one relative rotational position thereof a zero wedge angle maintaining the refracted light rays parallel to the incident light rays, means fixing the relative rotational positions of the optical wedges in each pair at said zero wedge angle, and drive means rotating each pair of optical wedges at different rotational velocities.

References Cited in the file of this patent

UNITED STATES PATENTS

| 942,393 | Konig | Dec. 7, 1909 |
| 1,647,631 | Ives | Nov. 1, 1927 |
| 1,682,572 | Keuffel | Aug. 28, 1928 |

FOREIGN PATENTS

| L19,352 | Germany | Nov. 10, 1955 |